(12) United States Patent
Nold

(10) Patent No.: US 10,207,235 B2
(45) Date of Patent: Feb. 19, 2019

(54) PROCESS AND DEVICE FOR THE STEAM REFORMING AND STEAM CRACKING OF HYDROCARBONS

(71) Applicant: LINDE AKTIENGESELLSCHAFT, Munich (DE)

(72) Inventor: Michael Nold, Wolfratshausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 32 days.

(21) Appl. No.: 15/034,213

(22) PCT Filed: Nov. 7, 2014

(86) PCT No.: PCT/EP2014/002986
§ 371 (c)(1),
(2) Date: Jun. 23, 2016

(87) PCT Pub. No.: WO2015/070963
PCT Pub. Date: May 21, 2015

(65) Prior Publication Data
US 2016/0354746 A1 Dec. 8, 2016

(30) Foreign Application Priority Data

Nov. 15, 2013 (DE) .......... 10 2013 019 148
May 20, 2014 (DE) .......... 10 2014 007 470

(51) Int. Cl.
*B01J 8/04* (2006.01)
*B01J 8/06* (2006.01)
(Continued)

(52) U.S. Cl.
CPC ............ *B01J 8/062* (2013.01); *B01J 8/0457* (2013.01); *B01J 8/0496* (2013.01); *B01J 8/067* (2013.01);
(Continued)

(58) Field of Classification Search
CPC ............ B01J 8/0496; B01J 2208/00504; B01J 8/067; B01J 8/0446; B01J 8/062;
(Continued)

(56) References Cited

U.S. PATENT DOCUMENTS 3,573,012 A * 3/1971 Kitzen et al. ............ C10G 9/14
422/201
2,101,485 A1 10/2012 Youker
(Continued)

*Primary Examiner* — Amber R Orlando
*Assistant Examiner* — Syed T Iqbal
(74) *Attorney, Agent, or Firm* — Millen White Zelano & Branigan, PC

(57) ABSTRACT

A furnace and a process for temperature control of a material stream, wherein the furnace has a first combustion chamber, at least one reactor tube for receiving the material stream to be heated, and at least one second combustion chamber. The at least one reactor tube extends through the first combustion chamber and through the at least one second combustion chamber. The furnace is designed to establish a first temperature in the first combustion chamber and a second temperature in the at least one second combustion chamber, wherein the first temperature and the second temperature are separately adjustable.

13 Claims, 2 Drawing Sheets

(51) Int. Cl.
 *C01B 3/38* (2006.01)
 *F23C 6/04* (2006.01)
 *B01J 19/00* (2006.01)
(52) U.S. Cl.
 CPC ........... *B01J 19/0013* (2013.01); *C01B 3/382* (2013.01); *C01B 3/384* (2013.01); *B01J 2208/0053* (2013.01); *B01J 2208/00053* (2013.01); *B01J 2208/00061* (2013.01); *B01J 2208/00504* (2013.01); *B01J 2208/065* (2013.01); *B01J 2219/002* (2013.01); *B01J 2219/00204* (2013.01); *B01J 2219/00213* (2013.01); *C01B 2203/0233* (2013.01); *C01B 2203/0811* (2013.01); *C01B 2203/0816* (2013.01); *C01B 2203/0866* (2013.01); *C01B 2203/1247* (2013.01); *C01B 2203/142* (2013.01); *C01B 2203/143* (2013.01); *F23C 6/04* (2013.01)

(58) Field of Classification Search
 CPC ..... B01J 2208/00176; B01J 2208/0053; C01B 2203/142; C01B 3/382; C01B 2203/0233; C01B 3/384; C01B 2203/0816
 See application file for complete search history.

(56) References Cited

U.S. PATENT DOCUMENTS

2009/0094894 A1* 4/2009 Genkin .................. B01J 8/0446
 48/62 R
2012/0259147 A1 10/2012 Payne

* cited by examiner

PROCESS AND DEVICE FOR THE STEAM REFORMING AND STEAM CRACKING OF HYDROCARBONS

The invention relates to a furnace for the cracking of hydrocarbons for producing olefins, to a reformer for hydrogen generation via the steam reforming of methane and to a process for bringing a material stream flowing in a furnace to, and maintaining it at, a temperature.

Steam reforming of methane for hydrogen generation is a known process. In such a process, a warmed material stream is passed through a bundle of reactor tubes, which bundle is situated in a fire box also termed firing chamber) of a furnace, The material stream in this ease contains the methane-containing feed, and also steam. The reactor tubes extend through the ceiling of a vertically extending fire box, and then out from the fire box at the base opposite the ceiling. To heat the material stream in the reactor tubes, burners are provided on the ceiling of the fire box, the burners generating very high temperatures (for example up to 1800° C. in the flame) locally in the furnace. The reactor tubes of the tube bundle therefore are made of a correspondingly heat-resistant material that can withstand the extreme heat. The gas burners are normally in flame operation, which leads to an inhomogeneous temperature distribution developing in the fire box, wherein the temperature decreases downwards from the ceiling of the fire box.

The steam cracking of hydrocarbons is likewise a known process. In such a process, a warmed material stream is passed through a bundle of reactor tubes which are situated in a fire box of a furnace. The material stream in this case contains the gaseous hydrocarbon-containing feed, and also steam. The reactor tubes extend through the ceiling of a vertically extending fire box, into the fire box where they are bent tightly above the base of the tire box and. then extend upwards and out of the fire box. For heating the material stream, burners are provided on the base or on the side wall of the fire box, the burners generating very high temperatures for example up to 2000° C. in the flame) locally in the furnace. The reactor tubes of the tube bundle therefore are made of a correspondingly heat-resistant material to withstand the extreme heat conditions.

On entry of the material stream into the tire box, the reactor tubes are first protected against overheating by the comparatively cold material stream. However, as the material stream heats up, it can no longer cool the tubes sufficiently. Therefore the temperature of the firing must be limited so as not to overheat the tubes. The temperature of the material stream is dependent on the flow velocity of the material stream, the temperature profile in the fire box and other factors, such as the type and amount of catalyst material arranged in the tubes. Reaction conditions, including the temperature course in the fire box, are variable only to as limited extent as a result of these factors and also because the reactor tubes must not be overheated. The result is that the efficiency of the energy transfer from temperature differences between firing and material stream is limited by the tubes. For both processes, a high degree of energy efficiency is of great importance for economic reasons. It is therefore common to utilize the waste heat of burnt fuel.

One object of the present invention is to provide a device and a process to permit more flexible handling of the reaction dynamics in the material stream with simultaneously high energy efficiency, and at the same time ensure sufficient protection of the reactor tubes against overheating.

This problem is solved by a furnace and also a process having the features described herein. The invention provides a mummer of advantages as described hereinbelow.

According to the invention the furnace includes a first combustion chamber with at least on reactor tube passing therethrough for receiving the material stream to be heated. The furnace also includes at least one second combustion chamber, wherein the reactor tube also passes through the second combustion chamber. The furnace is designed to allow independent adjustment of a first temperature generated in the first combustion chamber and a second temperature generated in the at least one second combustion chamber.

By using this multichamber principle, the temperature courses in the material stream may be adjusted better, since the ambient temperature in the second combustion chamber (s) is separately adjustable, and therefore a temperature difference between the reactor tube and the second combustion chamber(s) can be preset. As a result, the protection of the reactor tube against overheating can be ensured. At the same time, temperature control of the material stream in a reactor tube is made possible. The furnace can have a plurality of reactor tubes for receiving and heating the material stream, which reactor tubes can form a tube bundle.

The reactor tube passes through the combustion chambers in such a manner that a material stream flowing therein first passes through the first combustion chamber, and then through the second combustion chamber and any further combustion chambers.

The furnace has at least one first burner which is designed to burn fuel and generate a flame that heats a material stream flowing through the first combustion chamber. The furnace can also have a plurality of such first burners in the first combustion chamber.

The furnace has at least one second burner, which is designed to oxidize flamelessly a fuel in the second combustion chamber(s) (known as an FLX burner).

A plurality of such second burners can be provided in the second combustion chamber (or any further combustion chambers).

Flameless oxidation (FLX) is distinguished by the reduction of the formation of nitrogen oxides. By using second burners having a high entry impulse of the air stream, good flue gas mixing is generated, which leads to a homogeneous temperature distribution in the corresponding combustion chamber.

The first burner(s) is arranged on a ceiling or on a base of the first combustion chamber. The reactor tube enters into the first combustion chamber on the same side of the first combustion chamber where the first burner(s) is located. The reactor tube exits from the first combustion chamber on the site that is opposite from where the first burner(s) is located.

The furnace may have a fire box which is subdivided into the first and the second combustion chamber(s) by a wall. Alternatively, separate combustion chambers in the form of separate fire boxes can be provided.

The first and the second combustion chamber(s) may share a common wall. For a plurality of combustion chambers in the form of separate units, the combustion chambers are connected by the reactor tubes which run between the units.

The furnace is designed so that the first temperature generated in the first combustion chamber is higher than the second temperature generated in the second combustion chamber(s). The temperature distribution in the first combustion chamber is heterogeneous because of the arrangement of the first burner(s). Therefore, the first temperature is defined as the temperature in the region of the flame of the first burner(s).

The furnace is also designed to provide an adjustable homogeneous second temperature in the second combustion chamber(s). This homogeneous heating is particularly accomplished when the second combustion chamber(s) is heated by the FLX process.

Second burners in the form of burners are suitable for developing a spatially homogeneous temperature profile which is not the case with a burner operated in flame mode.

The invention also provides a process for raising the temperature of a material stream and holding the material stream at that temperature, wherein the material stream is heated by flowing through at least one reactor tube of a furnace. The material stream is heated to a first adjustable temperature in a first combustion chamber and subsequently to a second, separately adjustable temperature in at least one second combustion chamber. This process serves to protect the reactor tube(s) against overheating.

A homogeneous second temperature is set in the second combustion chamber(s). In the first combustion chamber, the material stream flowing in the reactor tube(s) is exposed to a first temperature decreasing in the direction of flow, wherein the maximum of the first temperature is markedly higher (several 100 K) than the second temperature.

The process according to the invention may be applied to various processes in furnaces.

The invention may be used for reacting a material stream of hydrocarbon compounds and steam, optionally with the use of suitable catalysts, in the furnace to form hydrogen and carbon oxides. This chemical reaction is known as steam reforming. As catalysts, nickel-based or noble metal-based catalyst materials are used.

The invention may also be used to react a material stream that contains relatively long-chain hydrocarbon compounds, such as naphtha, propane, butane and or ethane, and water, wherein the hydrocarbon compounds react with the water in the furnace to form olefins such as ethane and propene. This chemical reaction is known as steam cracking.

The material stream may contain propane and steam, wherein the propane, optionally in the presence of corresponding catalysts, is reacted in the furnace to form propene by a propane dehydrogenation reaction.

Further features and advantages of the invention are described below with reference to FIG. 1 and FIG. 2.

Figure 1:
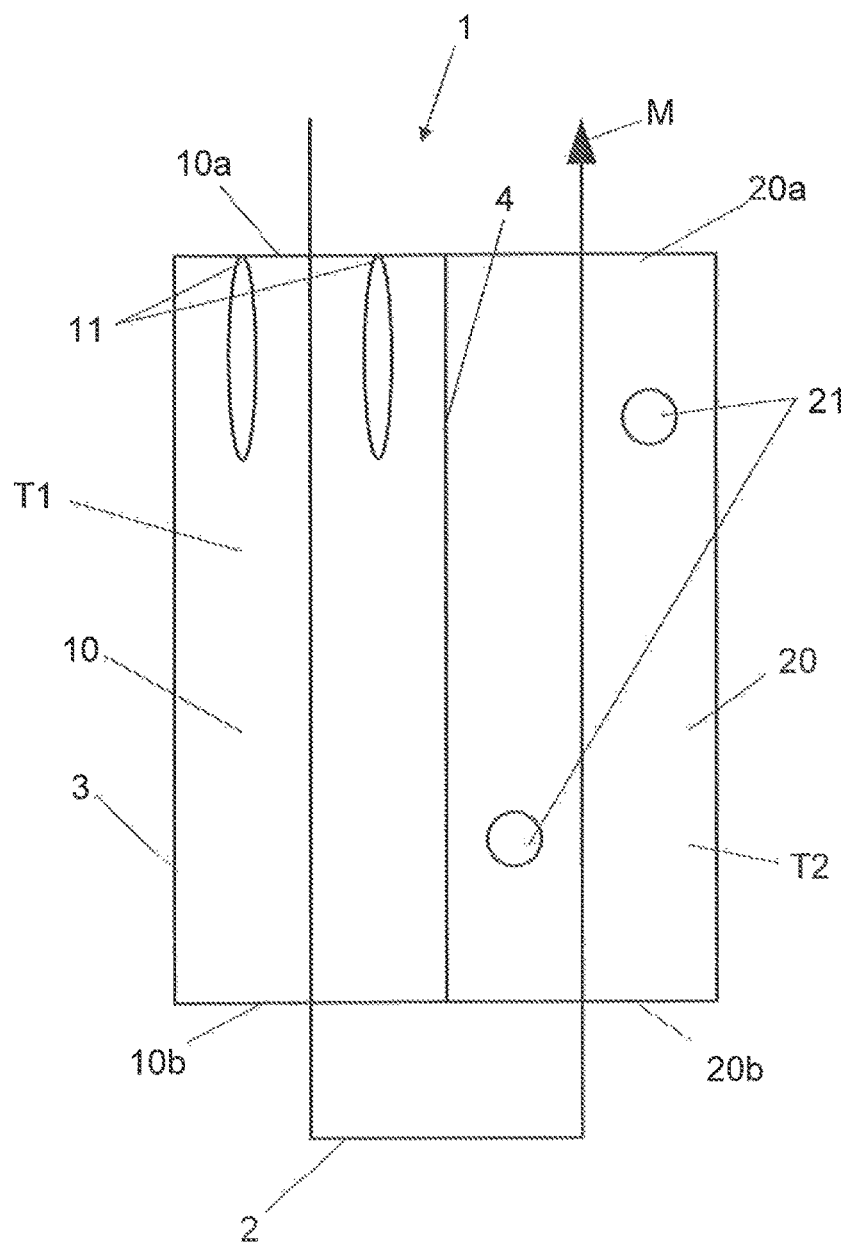
FIG. 1 is a schematic image of a furnace according to the invention.

FIG. 1 shows a schematic depiction of a furnace 1 according to the invention. A material stream M, in at least one reactor tube 2, or a reactor tube bundle 2, is introduced into a first combustion chamber 10 through the ceiling 10a of a the first combustion chamber 10. On the ceiling 10a of the first combustion chamber 10, at least one first burner 11 is provided which, in this example, oxidizes a fuel with formation of a flame. In the first combustion chamber 10, the material stream M heats up. The reactor tube(s) 2 exits the first combustion chamber 10 through the base 10b of the first combustion chamber 10 that is opposite the ceiling 10a and enters, through the base 20b of a second combustion chamber 20, into the second combustion chamber 20. In this second combustion chamber 20, two second burners in the form of FLX burners 21 are arranged diagonally opposite one another, the burners 21 designed to generate a comparatively homogeneous spatial temperature profile in the second combustion chamber 20. The material stream M which, in this section, comprises partly reagent and product, exits from the furnace 1 through the ceiling 20a of the second combustion chamber 20 and can be farther processed. In FIG. 1, the first and the second combustion chambers 10, 20 are formed by one fire box 3 which is subdivided into the two combustion chambers 10, 20 by a central, vertically running wall 4, in such a manner that the two combustion chambers 10, 20 are laterally adjacent to one another. Further combustion chambers in the form of the second combustion chamber 20 can be provided and can be connected laterally, to the second combustion chamber 20.

Figure 2:
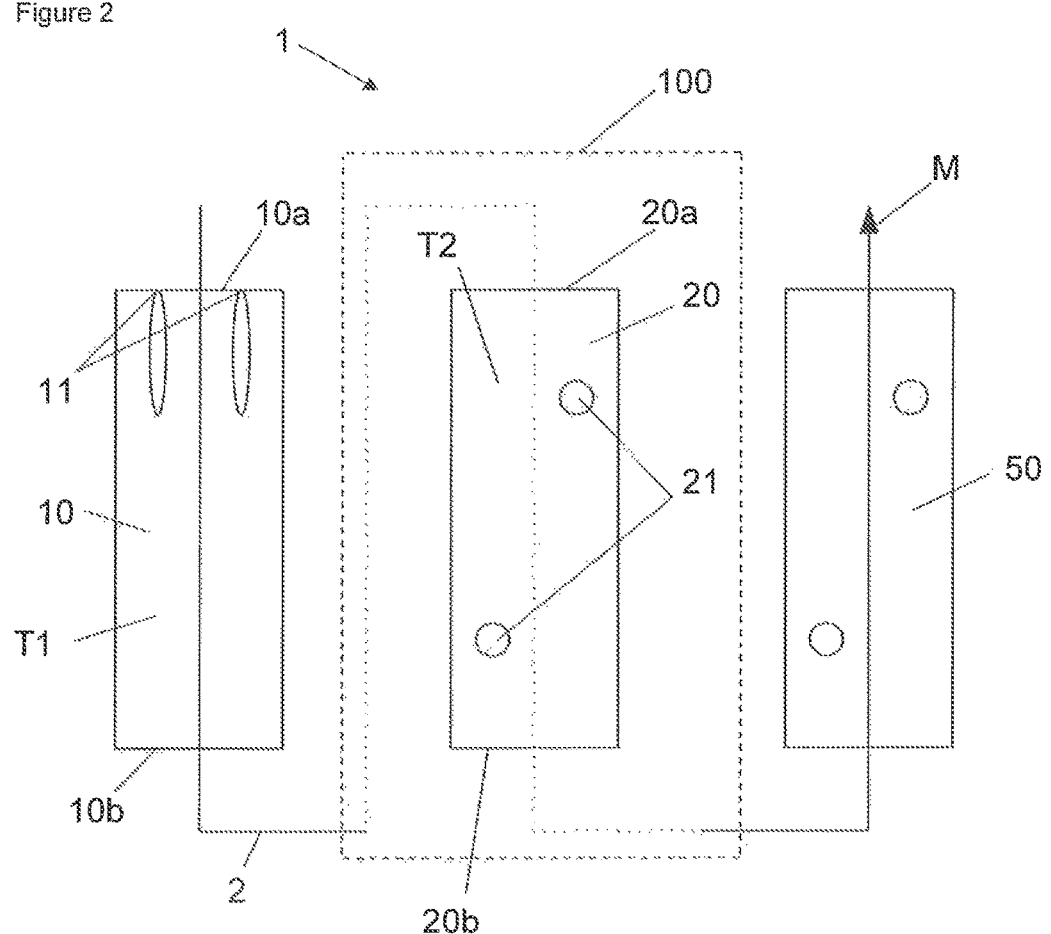
FIG. 2 is a schematic image of a further embodiment of a furnace according to the invention.

In FIG. 2, the material stream M is first heated in a first combustion chamber 10, which operates in the flame-oxidation mode. The material stream M then enters a second combustion chamber 20 which is heated using the FLX process. In FIG. 2, the material stream M (and the at least one reactor tube 2) enters the second combustion chamber 20 through the ceiling 20a of the second separate combustion chamber 20 and exits at the base 20b thereof. The dotted depiction of the reactor tube(s) 2 indicates a region or a module 100 of the furnace 1, which can be serially connected at this point. This module 100 has a section of the reactor tube(s) 2 (shown by dotted tine) and the second combustion chamber 20. More than one module can be utilized with the temperature controlled separately in each module. After passing through a last combustion chamber 50, the material stream M exits therefrom and can be appropriately further processed. A modification of the arrangement according to FIG. 2 arranges the combustion chambers 10, 20, 50 in a single fire box subdivided by walls of the fire box.

The invention claimed is:

1. A furnace having a first and at least one second combustion chamber and at least one reactor tube extending through the first and the at least one second combustion chamber for receiving a material stream that is to be heated, thereby flowing first through the first combustion chamber, and then through the at least one second combustion chamber, at least one first burner in the first combustion chamber, for burning a fuel and generating a flame to heat the material stream, wherein a first temperature generated in the first combustion chamber and a second temperature generated in the at least one second combustion chamber are each adjustable separately, characterized in that the furnace has at least one second burner in the at least one second combustion chamber to oxidize flamelessly a fuel.

2. The furnace according to claim 1, characterized in that the at least one first burner is located on a ceiling or on a base of the first combustion chamber, wherein, the at least one reactor tube enters the first combustion chamber on the side of the first combustion chamber where the at least one first burner is located, and wherein, the at least one reactor tube exits from the first combustion chamber on the side of the first combustion chamber that is opposite the location of the at least one first burner.

3. The furnace according to claim 1, characterized in that the furnace has a fire box which is subdivided by at least one wall into the first combustion chamber and the at least one second combustion chamber.

4. The furnace according to claim 1, characterized in that a first temperature generated in the first combustion chamber is higher than a second temperature generated in the at least one second combustion chamber, wherein the difference between the first temperature and the second temperature is several 100 K.

5. The furnace according to claim 4, characterized in that the second temperature is homogenous and is adjustable.

6. The furnace according to claim 3, characterized in that combustion chambers are formed by separate fire boxes.

7. A process for heating a material stream in at least one reactor tube of a furnace the process comprising heating the material stream in a first combustion chamber of the furnace, to a first temperature, and subsequently heating the material stream to a second temperature in at least one second combustion chamber of the furnace, wherein the first temperature and the second temperature are separately adjustable, characterized in that the second temperature is homogenous.

8. The process according to claim 7, characterized in that the material stream contains hydrocarbon compounds and steam, wherein the hydrocarbons are reacted with the water to form hydrogen and oxidized carbon compounds.

9. The process according to claim 8, characterized in that the hydrocarbon compounds, are naphtha, propane, butane or ethane, and wherein the hydrocarbon compounds are reacted with the water to form olefins.

10. The process according to claim 7, characterized in that the material stream contains propane and steam, wherein the propane is reacted to form propene.

11. The process according to claim 8, characterized in that the hydrocarbons are reacted with the water in the presence of a catalyst.

12. The process according to 9, characterized in that olefins are ethene or propene.

13. The process according to claim 10, characterized in that the propane is reacted in the presence of a catalyst.

* * * * *